United States Patent

[11] 3,543,917

| [72] | Inventor | Arnold Duerksen<br>Salinas, California |
|---|---|---|
| [21] | Appl. No. | 735,084 |
| [22] | Filed | June 6, 1968 |
| [45] | Patented | Dec. 1, 1970 |
| [73] | Assignee | Cochran Western Corporation,<br>Salinas, California<br>a corporation of California |

[54] INCLINED ELEVATOR CONVEYOR
9 Claims, 10 Drawing Figs.

[52] U.S. Cl. ..................................... 198/233,
198/18, 198/153, 198/158
[51] Int. Cl. ..................................... B66b 9/12;
B65g 17/06, B65g 17/34
[50] Field of Search .......................... 198/233,
16, 16(MS), 18, 158

[56] References Cited
UNITED STATES PATENTS

| 3,033,340 | 5/1962 | Coryell .................... | 198/16 |
| 3,184,045 | 5/1965 | Fry .......................... | 198/233 |

*Primary Examiner*—Richard E. Aegerter
*Assistant Examiner*—Roger S. Gaither
*Attorney*—Flehr, Hohbach, Test, Albritton & Herbert ABSTRACT: An elevator conveyor wherein a series of horizontal platforms, articulated in sections, travel an inclined, reversible cyclic path. The leading and trailing ends of the platforms include positive stops. The leading stops move out of the way of cargo on the platform while the trailing stops continue to follow the cargo as it is discharged onto a cargo handling receiving table. The direction of cargo movement is varied by variously directing the table.

Fig. 1

INVENTOR.
Arnold Duerksen

Fig. 2

INVENTOR.
Arnold Duerksen
BY Flehr, Hohbach, Test,
Albritton & Herbert
Attorneys

INCLINED ELEVATOR CONVEYOR

BACKGROUND OF THE INVENTION

This invention pertains to conveyor constructions of a type for conveying loads along an inclined path while holding the load upon a horizontally disposed surface. The invention is particularly suitable for use in mobilized loading and unloading of aircraft and other transport vehicles wherein the conveying apparatus can be brought alongside a transport and one end of the conveyor elevated to a position adapted to service the transport.

Elevator conveyors have heretofore been known of a type employing articulated platforms, each of which is adapted to be loaded, and upon being raised vertically to a discharge location, transferred to a position suitable for discharging the load carried upon the elevator platform. Apparatus of the foregoing kind has been subject to certain limitations and, for example, is not particularly suitable for servicing transports wherein the cargo hatch of each transport may be at a different height above the ground.

OBJECTS AND SUMMARY OF THE INVENTION

Accordingly, it is a general object of the present invention to provide an improved and mobilized elevator conveyor of a type for servicing the cargo hatches of transports notwithstanding the differing heights of such cargo hatches above ground level.

Another object of the invention is to provide an improved elevator conveyor wherein the elevator platforms are carried along an inclined path and maintained in a generally horizontal disposition.

Yet another object of the invention is to provide an elevator cargo conveyor arranged whereby a cargo handling table is located at the elevated end of the inclined path and is positionable whereby the lateral angle of discharge into a transport aircraft, for example, can be readily varied so as to accommodate any misalinement in bringing the elevator conveyor alongside the aircraft.

These and other objects of the invention will be more clearly apparent from the detailed description of a preferred embodiment described further below.

In general, there has been provided herein elevator conveyor apparatus of a type which is adapted to be reversible and which is characterized in general by a frame including a pair of laterally spaced, elongated guide channels and means serving to selectively incline the guide channels relative to the horizontal so as to selectively elevate one end of the frame of the apparatus above the other. The guide channels serve to define a cargo handling path adapted to be selectively inclined. Articulated cargo platforms are arranged to move along the path. In addition, cyclically moving chain means also move along the path and are coupled to draw the platforms along the path. Support members are carried by the platforms and are guided by the guide channels so as to support one end of the platforms, such as the trailing end, as the platforms move along the cargo handling path. The chain means serves to support the other end of each platform for movement along the cargo handling path and, upon reaching one end of the path, the platforms, being articulated, pass around the end of the cyclic path and continue movement along a return run thereof. Means are provided to engage the platforms as they move along the return run and hold them in a stretched but condition whereby the platforms move generally in their own plane. The foregoing construction is carried upon a self-propelled vehicle frame whereby the driver can properly position the platforms relative to a cargo hatch.

Figure 1:
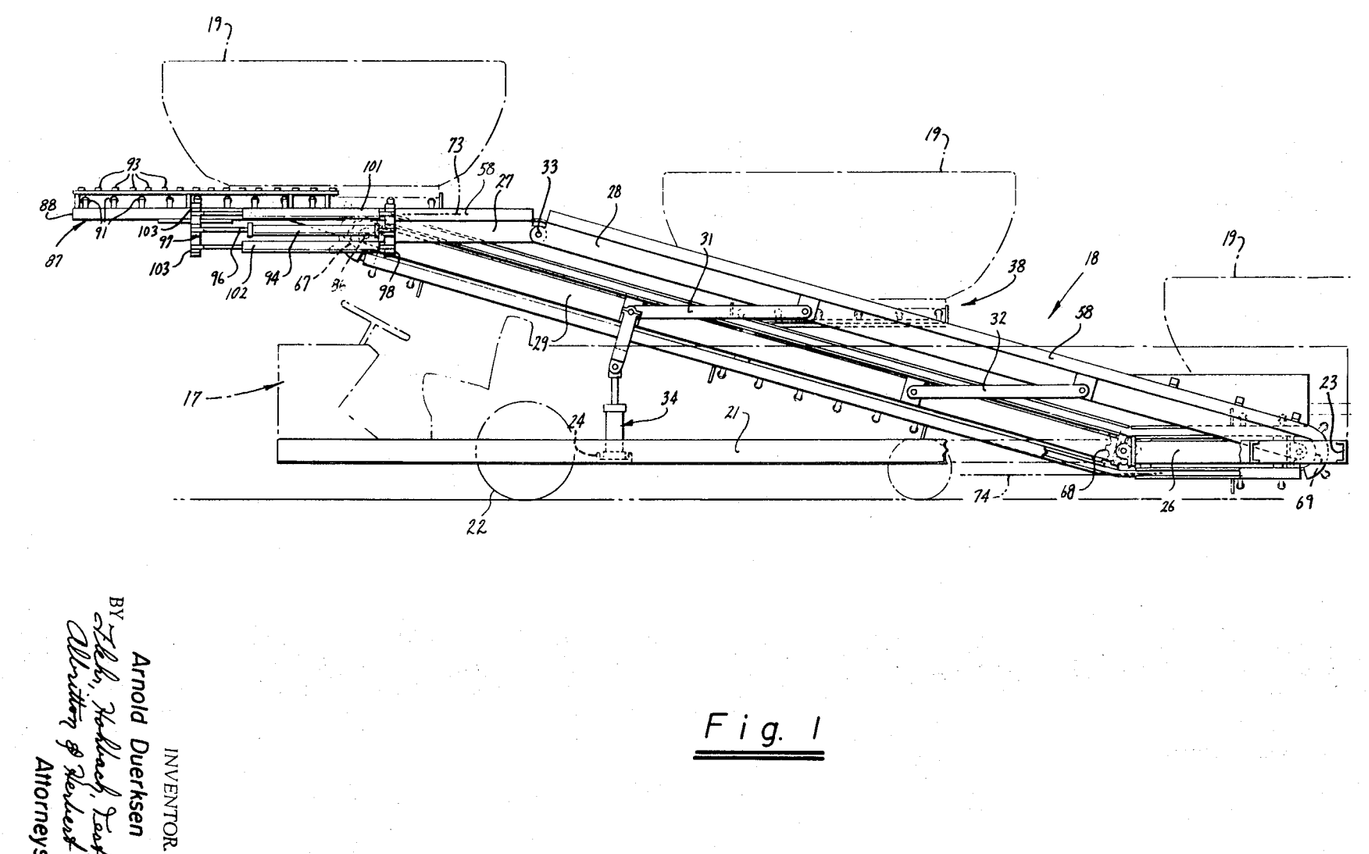
FIG. 1 is a side elevation view showing an elevator conveyor apparatus according to the invention.
Figure 2:
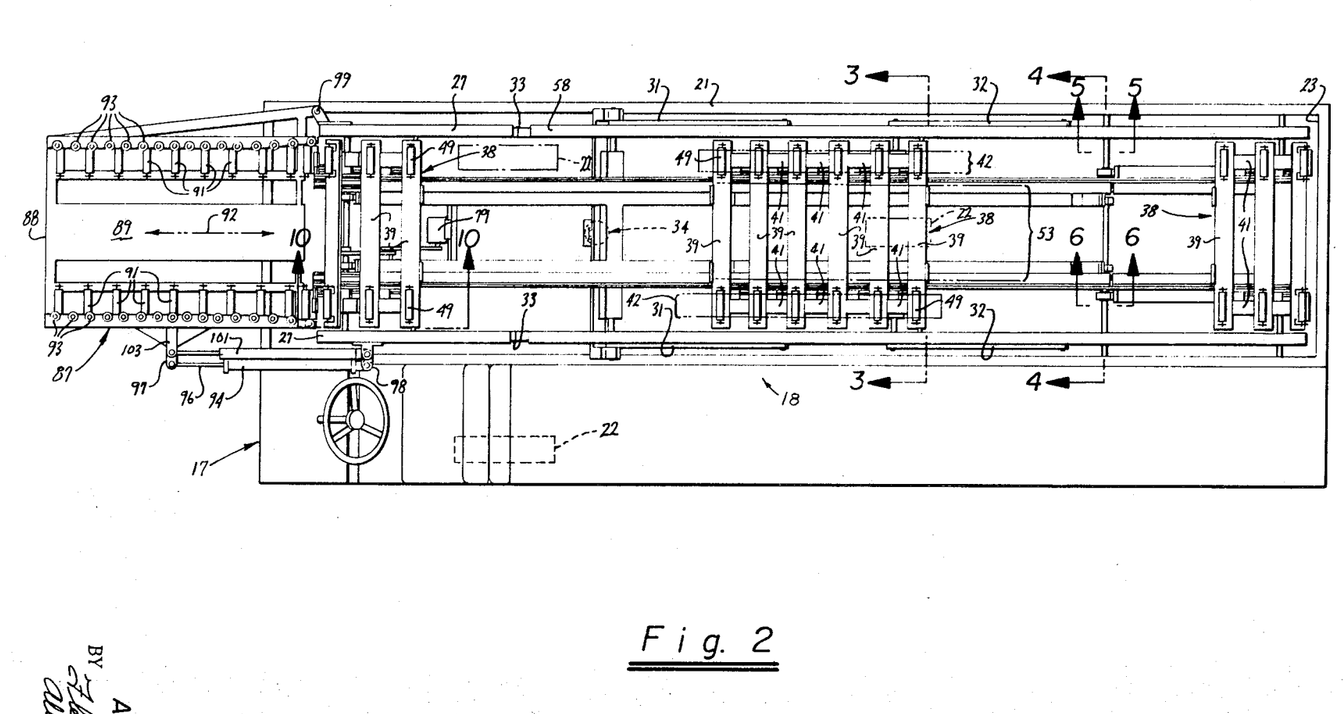
FIG. 2 is a plan view of FIG. 1.

Referring generally to FIGS. 1 and 2, an elevator conveyor machine 18 arranged for loading and unloading modular baggage containers 19 into and out of a cargo hatch (not shown) of aircraft is built upon a self-propelled, steerable automotive vehicle 17 having a generally rectangular box frame or chassis 21 rollably supported as by the wheels 22. As thus arranged, the machine 18 can be maneuvered generally into position alongside an aircraft for cargo handling operations with respect thereto.

Frame 21 is reinforced at its right-hand end by a transversely extending cross brace 23 and on the left reinforced by another cross brace 24.

A pair of laterally spaced parallelogram frames each comprise a pair of end members 26, 27 and a pair of side members 28, 29. Parallelogram support arms 31, 32 pivotally connected at their opposite ends to side members 28, 29 serve to maintain parallelism between members 28, 29 as do the end members 26, 27. As thus arranged, it will be evident that each frame is further pivotally arranged at each corner of the parallelogram, such as at 33, for example, whereby an upward thrust applied by the hydraulic actuator 34 carried upon cross brace 24 serves to permit the pairs of side members of the parallelogram to be selectively inclined at various angles to the horizontal so as to selectively elevate one of each pair of end members, namely, end members 27 on both sides of the machine 18, relative to the other end members, namely, end members 26.

Articulated platform assemblies 38, carried between the parallelogram frames, are supported in a generally horizontal load supporting disposition and move along a cyclic inclined path, upwardly or downwardly as required by loading or unloading circumstances, which path is defined by the inclined side members 28, 29. Thus, during loading operations, ordinarily modular baggage containers 19 will move upwardly and to the left as shown in FIG. 1 during which delivery run of the cyclic path defined by the movement of platforms 38, the platforms will be oriented in a generally horizontal disposition. As will be described further below, platform assemblies 38 move generally in their own plane during a return run portion of the inclined cyclic path.

While it will be evident that both loading and unloading can be accomplished by the elevator conveyor machine 18, it is to be understood that unloading operations are accomplished merely by a reversal of the operation of the apparatus and accordingly, for clarity hereinafter, it is to be assumed that operation and description of the apparatus will be referred to as in circumstances wherein containers 19 are being loaded from the lower end of machine 18 upwardly to the elevated end thereof.

Thus, each platform assembly 38, as best shown in FIGS. 7—10, comprises a number of transversely extending battens 39. Between each adjacent pair of battens 39 a spacer plate 41 is carried to form a longitudinally extending bracing zone 42 (shown in FIG. 2) whereby the battens 39 and plates 41 cooperate to prevent the plane of platform assembly 38 from buckling upwardly at each end of platform assembly 38 out of the plane thereof. On the other hand, platform assembly 38 is mounted by means, now to be described, whereby each batten 39 and plate 41 are articulated to pivot downwardly out of the plane of assembly 38.

Figure 7:
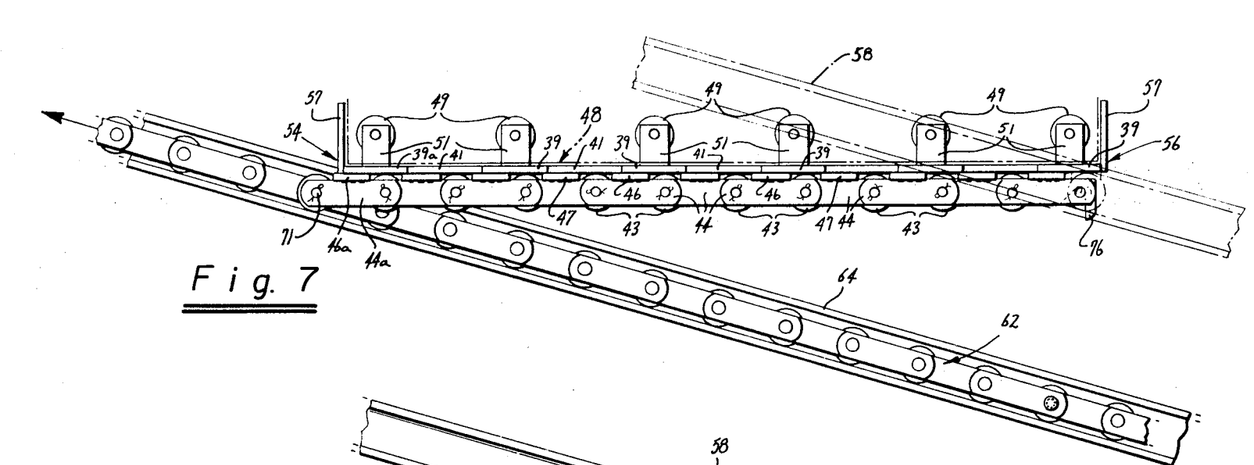
FIGS. 7 and 8 are respectively enlarged detail side elevation views, partially in section and partially broken away for clarity, taken along the lines 7—7 and 8—8 of FIG. 3.
Figure 8:
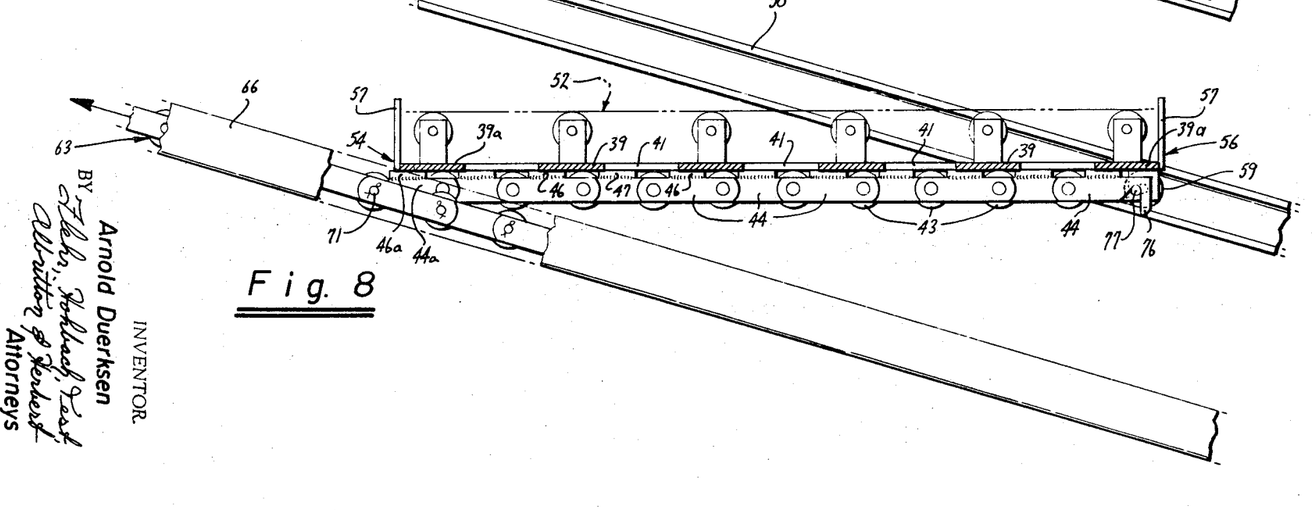

Thus, battens 39 and plates 41 are each mounted to be carried between adjacent pairs of rollers 43, the axles of each pair of rollers 43 being connected by links 44 as of a chain. Battens 39 extend transversely of the path of cyclic movement of platform assemblies 38 sufficiently whereby the opposite ends of each batten 39 are supported by spacer plates 46 of sufficient thickness to elevate the lower surface of each batten 39 to a plane corresponding substantially to the periphery of rollers 43. Spacer plates 46, accordingly, are carried by the associated links 44. Similarly, spacer plates 47 underlie each of the plates 41 so as to place all of plates 41 and battens 39 in a common plane as shown in FIGS. 7 and 8 and thereby provide a planar support platform defining the bottom of a load receiving zone 48.

However, where modular baggage containers 19 or the like are to be employed, it has been found that the further provision of platform rollers 49 supported at their ends by means of journal supports 51 preferably defines a rolling support plane 52 whereby containers 19 can be rolled on and off same with relative ease. Rollers 49 are arranged in generally alined, laterally spaced rows so as to define therebetween a work area 53 whereby personnel handling containers 19 will not be called upon to work upon the uncertain footing found in the areas of rollers 49. The work area 53 (FIG. 2) is thus generally unobstructed.

Means serving to define the leading end 54 and trailing end 56 of each platform assembly 38 moving upwardly along the inclined path comprises the pair of ears 57 secured, as by welding, to the spacer plate 46a which underlies the leading batten 39a and extends in supporting relation therealong to be carried at its opposite ends by links 44a. Each ear 57 extends away from batten 39a sufficiently to extend above the rolling support plane 52 and thereby define fixed stops at each end thereof serving to retain containers 19 upon platform assembly 38. It is to be appreciated, however, that the leading ears 57 will be initially disposed in container arresting position as platform assembly 38 travels into load receiving position at the right end (as shown in FIG. 2) of machine 18 before the right-hand ears 57 become pivoted into place. Conversely, at the upper end of the cyclic path travelled by platform assemblies 38, the right-hand ears 57 will remain in place so as to continue to urge a container 19 off of the rolling support plane 52 after the leading ears 57 have been folded down out of the way to commence the return travel of platform assembly 38.

Figure 3:
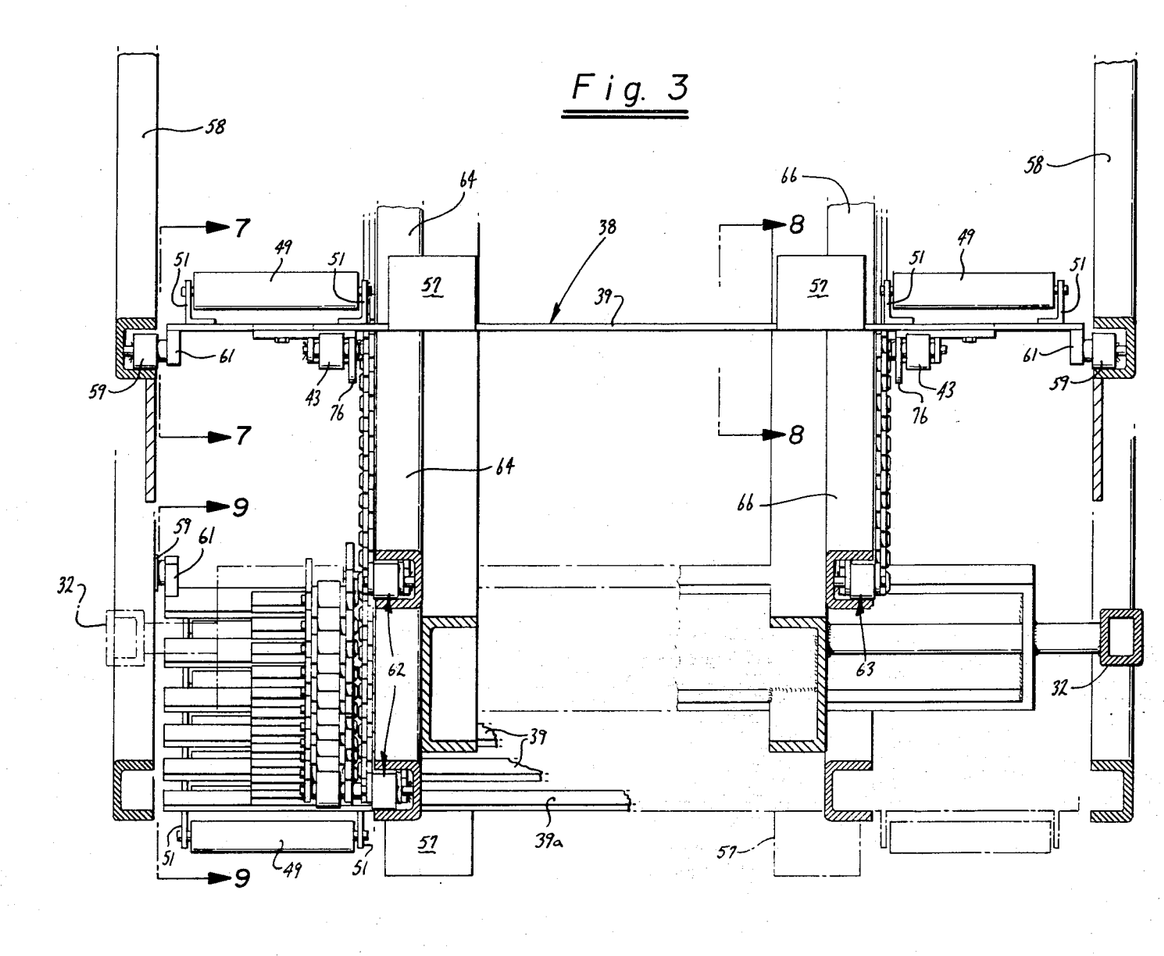
FIG. 3 is an enlarged detail section view taken along the line 3—3 of FIG. 2.
Figure 4:
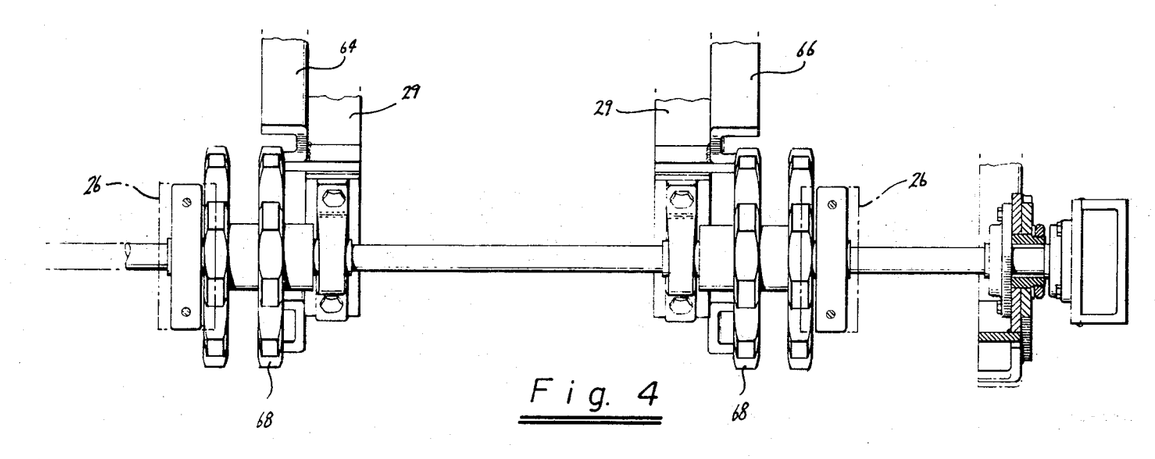
FIGS. 4, 5 and 6 are respectively enlarged detailed views taken along the lines 4—4, 5—5 and 6—6 of FIG. 2.
Figure 5:
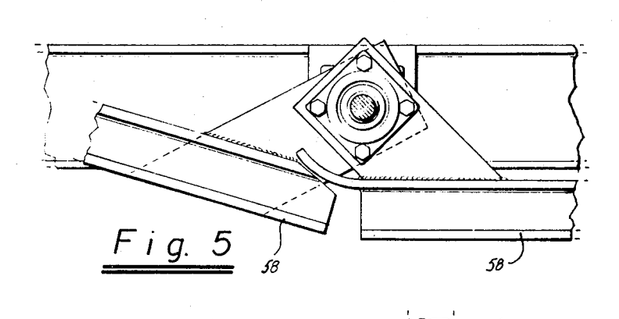
Figure 6:
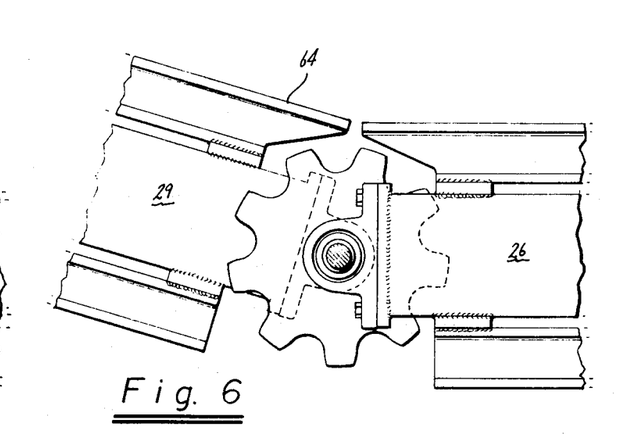

During a cargo delivery run (whether loading or unloading), containers 19 are supported in a generally horizontal disposition by means of a pair of laterally spaced guide channels 58 formed as a part of side members 28 and end members 27. Thus, guide channels 58 serve to define a cargo handling path adapted to be selectively inclined by movement of the parallelogram frame described above. Support members, such as the support rollers 59 (FIG. 8), are carried in journaled braces 61 hung beneath the end batten of platform 38. Rollers 59 are guided by channels 58 so as to support one end 56 of each platform 38. The other end 54 of platform assembly 38 is supported by cyclically moving chain means in the form of the pair of cyclically moving chains 62, 63 housed respectively in chain channels 64, 66 (FIG. 3). Chains 62, 63 are each trained about an associated drive sprocket 67 (FIG. 10) at the upper end of its travel and about a first idler sprocket 68 and a second idler sprocket 69. Sprockets 68, 69 serve, in conjunction with the chain channels 64 or 66, to maintain the chain associated with the respective channels in a path generally parallel with the lower end member 26 of the parallelogram frame.

As thus arranged, it will be readily evident that the chains 62, 63 move, during the delivery portion of their cyclic travel, in a plane defined by the upper runs of each of the two chains 62, 63. During the return run of each of chains 62, 63, the two chains move in a plane defined by the lower chain channels.

Chains 62, 63 are coupled to the leading end of each platform assembly 38 by means of an elongated pivot pin 71 (FIG. 7) so as to draw platform assemblies 38 along the cyclic path of the chains.

The cyclic chains 62, 63 as thus connected cooperate with the guide channels 58 in supporting each platform assembly in a generally horizontal position for movement along the delivery run of the cyclic path thereof. Thus, the plane defined by channels 58 during the delivery run is generally spaced vertically relative to the plane defined by the delivery run of chains 62, 63 so as to support the trailing end 56 of platform assembly 38 above the plane of chains 62, 63.

Figures 9, 10:
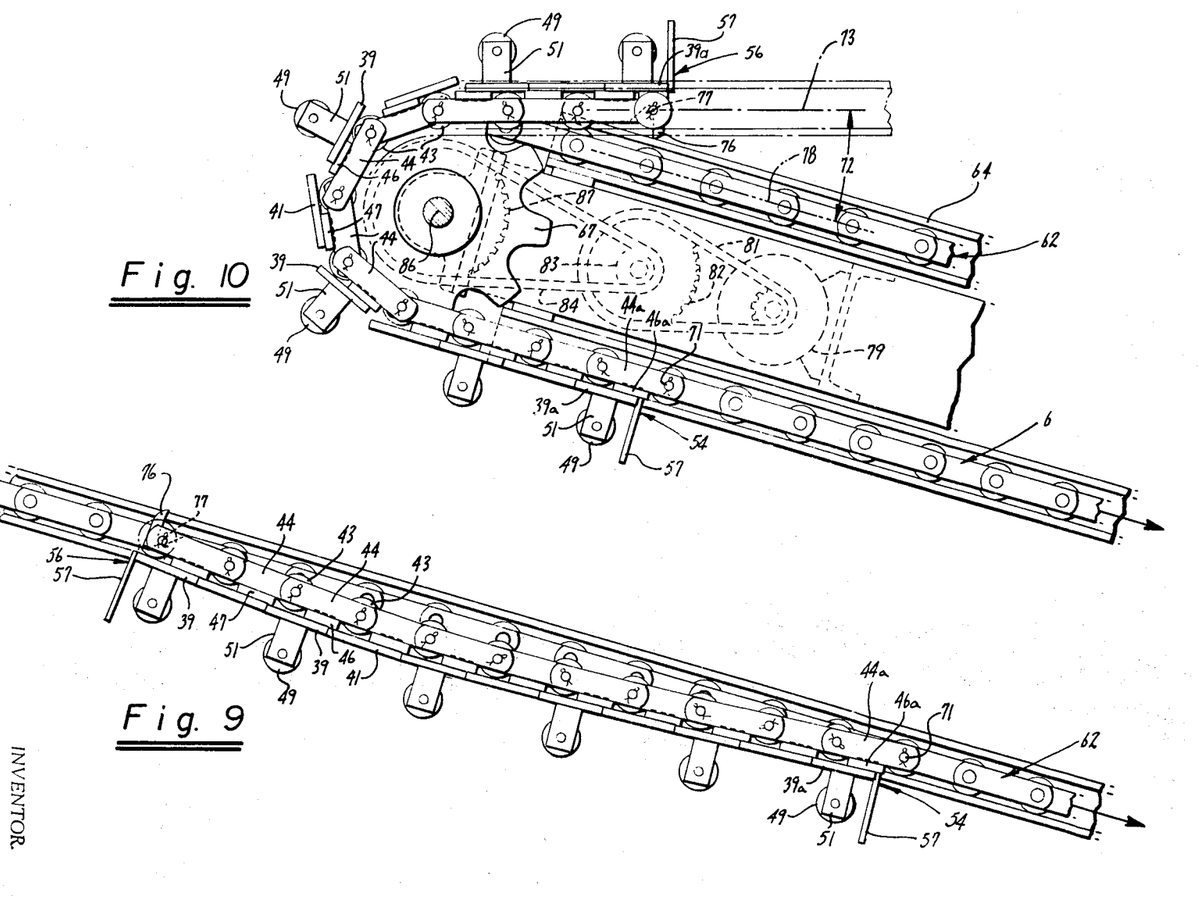
FIGS. 9 and 10 are respectively enlarged detail side elevation views respectively taken along the lines 9—9 and 10—10 of FIGS. 3 and 2, respectively.

At the upper end of the delivery run of the planes defined by chains 62, 63, the plane defined by channels 58 bends as defined by the upper end members 27 of the parallelogram frame whereby the two substantially parallel spaced planes merge along the angle 72 (FIG. 10). Thus, the plane 73 matches the pitch line of drive sprockets 67 as does a comparable plane 74 (FIG. 1) defining the plane of movement of chains 62, 63 at their lower end as they approach sprocket 69.

Chain channels 64, 66 and the return run of guide channels 58 lie in a substantially common plane during a return run portion of the cyclic travel of the articulated platform assemblies 38 so as to carry platform assemblies 38 to move substantially in their own plane (FIG. 9). Thus, means are provided for substantially maintaining each articulated platform assembly 38 in a stretched out condition (FIG. 9) as now to be described.

Referring to FIGS. 8 and 10, it is to be noted that the trailing batten 39a carries a downwardly depending hook 76 formed as a portion of the link 44a attached to batten 39a. Hook 76 is disposed to be carried in a downwardly depending disengaged condition disposed to engage the laterally protruding extended hanger pin 77 as the plane 73 merges with the plane 78 defined by chains 62, 63, (see FIG. 10). Thus, as platform assembly 38 passes around drive sprockets 67, platform assembly 38 will be securely held at its trailing end to the chains 62, 63 whereby after inversion of platform assembly 38, the tendency of platform assembly 38 to buckle under the influence of gravity and thereby shorten the length of assembly 38 defined between its opposite ends 54, 56 will be precluded by continued engagement of hook 76 with pin 77.

Means for driving chains 62, 63 and for carrying platforms 38 along their cyclic path comprises a hydraulic motor 79 coupled by a chain drive belt 81 to suitable reduction gearing 82 so as to drive the pulley 83 and by means of another chain belt 84, sprocket 87 and hence the shaft 86 upon which sprockets 67 are mounted.

At the upper end of the parallelogram frame formed by end members 27, means are provided forming a cargo receiving table arranged to form a substantial continuation of the rolling support plane 52 of each platform assembly as it arrives at the upper end of its cyclic travel so as to receive cargo discharged from each platform 38.

Thus, means forming cargo receiving tables 87 (whether receiving cargo from platforms 38 or from an aircraft during discharge of cargo) comprises a generally rectangular frame 88 including a work surface 89 bounded by rows of cargo rollers 91 alined with rollers 49 so as to receive cargo therefrom and transfer cargo thereto as desired. Rollers 91 and work surface 89 define a cargo handling path 92 bounded at its lateral edges by laterally spaced apart lines of vertically oriented bumper rollers 93. Cargo table 87 can be pivoted so as to redirect path 92 and thereby aline the front of table 87 with the side of an aircraft being serviced, notwithstanding the fact that due to crowded conditions, for example, it may not be possible to bring the conveyor machine 18 truly perpendicularly into position relative to the fuselage of the aircraft.

Thus, means for pivoting table 87 includes the hydraulic actuator 94 wherein the connecting rod 96 has been pivotally coupled to a laterally protruding arm 97 attached to frame 88. The other end of actuator 94 is pivotally coupled to the bracket 98 carried on the side of member 27. Pivoting movement of table 87 is accomplished by the pivotal connection 99 whereby upon movement of connecting rod 96, the direction of path 92 may be varied by pivoting table 87 about the connection 99.

In order to prevent actuator 94 from applying a tilting or torqueing leverage to table 87 during adjustment of path 92 by means of actuator 94, there have been provided a pair of stabilizing cylinders 101, 102 formed as cylinders containing pistons connected by piston rods to the bracket 103 supporting the arm 97.

From the foregoing, it will be readily apparent that in operation, where it is assumed that platform assemblies 38 are moving upwardly along the inclined path of machine 18, as each platform 38 reaches the upper limit of its travel, the containers 19 will be moved forwardly onto table 87 by the continued engagement of the trailing ears 57 with the rear portion of containers 19.

At the same time, the leading ears 57 have been trained downwardly and directed into the return run of the cyclic path. In the event that the cargo must be slightly readjusted laterally, it is possible to operate actuator 94 and thereby redirect the cargo so that it passes directly into the center of the loading hatch of an aircraft, for example.

It will be further evident that the platforms are maintained in a stretched out position whereby as they travel along the return portion of their cyclic path, they will be held against any tendency for them to buckle and "drape" downwardly which could severely limit the operation of machine 18 in its lower angular disposition. Further, as platforms continue to move substantially in their own planes, they will travel about idler sprockets 69 and the first battens 39 to appear will carry fixed stops in the form of the upstanding ears 57 whereby cargo containers 19 can be initiated onto platform assembly 38 before it is fully formed. Upon being fully formed, however, the trailing stops in the form of ears 57 serve to "lock" the containers 19 firmly on platform assemblies 38 whereby they will not escape during travel upwardly along their inclined path of movement. As the platform assemblies 38 move upwardly along the inclined path, containers 19 will, however, be maintained in a generally horizontal orientation by the cooperation afforded between the guide channels 58 and the supporting action of chains 62, 63 carrying the leading end 54 of each platform assembly 38.

It will be readily evident that the angle of inclination of machine 18 can be readily adjusted by simply operating the hydraulic hoist or actuator 34 as desired.

The foregoing system, therefore, provides a mobilized loading and unloading machine which can be rapidly steered into position at the cargo hatch of aircraft notwithstanding obstructions such as highly rearwardly tapered wing constructions which make access otherwise quite difficult.

I claim:

1. In a conveyor construction, apparatus comprising a pair of laterally spaced parallelogram frames, each frame having pairs of end and side members pivotally arranged at each corner of the parallelogram to permit said pairs of side members of the parallelogram to be selectively inclined at various angles to the horizontal to selectively elevate one of each pair of end members relative to the other end member of its associated pair, means forming platforms each comprised of portions articulated with respect to each other and carried between said parallelogram frames, means serving to support said platforms in a generally horizontal load-supporting disposition and to move said platforms along a cyclic inclined path defined by said inclined side members, means for moving said platforms in their own planes during a return portion of the inclined cyclic path, and a self-propelled, steerable vehicular frame supported on wheels carrying the aforesaid structure.

2. In a conveyor construction, the combination comprising a self-propelled vehicle, a frame carried by said vehicle, means serving to selectively incline said frame relative to the horizontal to selectively elevate one end of the frame above the other, said frame carrying means forming a pair of laterally spaced guide channels serving to define a cargo handling path adapted to be selectively inclined by movement of said frame, means forming cargo platforms each comprised of a number of portions articulated with respect to each other and carried by said frame to move along said path, cyclically moving chain means along said path, means serving to couple said platforms to said chain means to move said platforms along said path, support members carried by said platforms and guided by said channels to support one end of said platforms, said chain means serving to support the other end thereof for movement along the cargo handling portion of said path, said chain means and said channels being disposed to support said platforms in generally horizontal planes when moving along the cargo handling portion of said path.

3. Conveyor apparatus as defined in claim 2 wherein the guide channels and chain means each include a return run thereof, said return runs lying substantially in a common plane, and means serving to retain said platforms in a stretched out disposition during travel thereof along said return runs.

4. In an elevator conveyor machine, the combination comprising a maneuverable vehicle supported on wheels, said vehicle carrying a cyclically trained carrier defining a cyclic path, rotatable means supporting the carrier at each end to define a delivery run and a return run of the carrier, the carrier passing around said rotatable means at each end of the carrier in making the transition from one run to the other, a platform articulated to pivot in sections about axes extending across said path when travelling around said rotatable means, said platform including positive stops at opposite ends thereof to define a load receiving zone for said platform, said stops being supported at a leading end of the zone to pivot out of the zone in response to pivoting of a section of the platform in passing around said rotatable means at one end of the cyclic path to permit cargo in said zone to be discharged freely therefrom, and means for variously inclining said path relative to the horizontal.

5. In a conveyor construction, the combination comprising a self-propelled vehicle, a frame carried by said vehicle, means serving to selectively incline said frame relative to the horizontal to selectively elevate one end of the frame above the other, said frame carrying means forming a pair of laterally spaced guide channels serving to define a cargo handling path adapted to be selectively inclined by movement of said frame, means forming articulated cargo platforms carried by said frame to move along said path, cyclically moving chain means along said path, means serving to couple said platforms to said chain means to move said platforms along said path, support members carried by said platforms and guided by said channels to support one end of said platforms, said chain means serving to support the other end thereof for movement along the cargo handling portion of said path, said chain means and said channels being disposed to support said platforms in generally horizontal planes when moving along the cargo handling portion of said path, planes through said chain means and said channels merge into a generally horizontal plane at the elevated end of said path to direct said platforms into a horizontal plane at said elevated end, a loading platform carried by said frame at the elevated end thereof and disposed and adapted to transfer cargo relative to said path, and means serving to pivot said loading platform laterally of said path to adjust the direction of cargo moving between said path and said loading platform.

6. In a conveyor construction, the combination comprising a frame, said frame including a pair of laterally spaced elongated guide channels, each said channel including a delivery run portion defining a cargo delivery path and a return run portion, said delivery run portions lying in an inclined plane, cyclic chain means including a delivery run portion and a return run portion wherein the delivery run portion lies in an inclined plane lying substantially parallel to and spaced from the first named inclined plane, means forming cargo carrying platforms to be cyclically moved by said chain means, said platforms each being comprised of a plurality of abutting sections to provide a cargo supporting surface thereon, said sections being articulated to move with respect to each other in a direction away from the cargo supporting surface thereof, means serving to couple one end of each of the platforms to said chain means for drawing said platforms therewith, means cooperating with said guide channels and supporting the other end of said platforms to maintain said platforms substantially horizontally disposed when travelling along the delivery portion of said inclined path, and a steerable self-propelled vehicle chassis supporting the aforesaid structure.

7. In a conveyor construction according to claim 6 wherein said chain means engages both the leading and trailing portions of each of said platforms and draws said platforms along said return run, the return run portions of said guide channels and of said chain means lying substantially in a common plane.

8. In an elevator conveyor machine, an articulated cargo carrying platform adapted to move in an inclined cyclic path having a cargo handling delivery run and a return run, means serving to move said platform in a substantially horizontal disposition along said inclined path, the leading end margin of said platform being carried to pivot out of the plane of the platform about an axis transverse to said path, said platform including a load receiving zone on the upper side thereof, positive stop means carried by said platform defining the leading and trailing ends of said zone, said stop means at the leading end of the zone being disposed to withdraw from said zone at one end of the cyclic path in response to pivoting movement of said leading end margin of said platform at said one end of the path, said stop means at the trailing end of the zone moving forwardly at said one end of the path as said cargo is discharged from the zone at said one end of the path, and self-propelled mobile vehicular means supporting all the aforesaid structure, said mobile means being maneuverable by the driver thereof to dispose an and of said path in load transferring relation with respect to a cargo hatch.

9. In an elevator conveyor machine according to claim 8 wherein there is further included means serving to form a cargo receiving table at said one end of said cyclic path to receive cargo thereon and to adjust the path of movement of said cargo relative to said cyclic path.